Dec. 9, 1930.　　　J. SINNER ET AL　　　1,784,550
DOUBLE READING PLUMB LEVEL
Filed Nov. 14, 1927
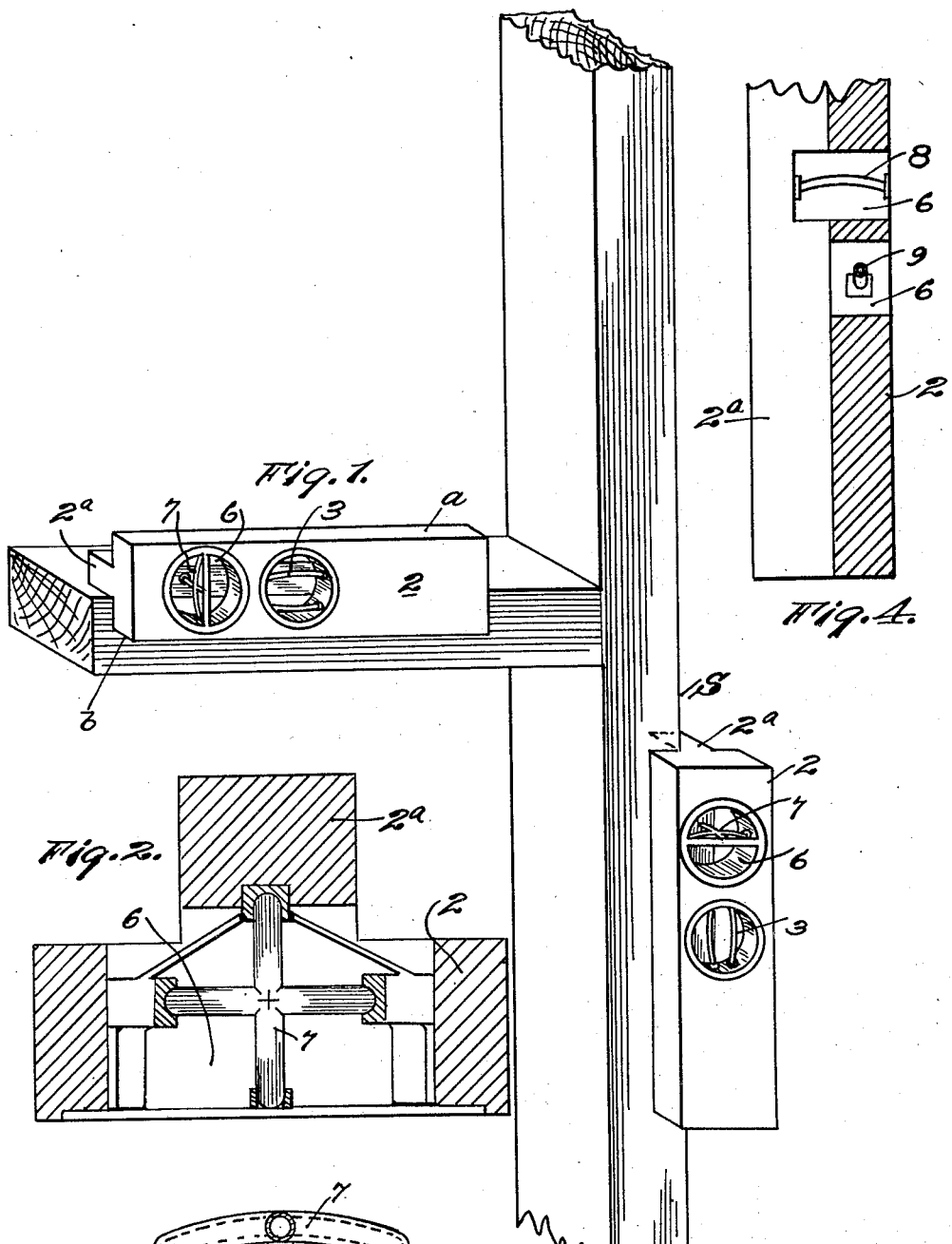
INVENTORS,
J. Sinner and
O. H. Sinner;
BY F.E. Maynard, ATTORNEY.

Patented Dec. 9, 1930

1,784,550

UNITED STATES PATENT OFFICE

JOHN SINNER AND OSCAR A. SINNER, OF LOS ANGELES, CALIFORNIA

DOUBLE-READING PLUMB LEVEL

Application filed November 14, 1927. Serial No. 233,177.

This invention relates to scientific instruments and especially to levelling and plumb lining devices.

In the various sciences and particularly structural engineering and architecture it is especially desirable to insure that a given element is vertically true in two planes at right angles to each other, as for instance in erecting studding and columns, and in wall corners, both salient and re-entrant.

Carpenters' levels are frequently provided with a transverse spirit glass and these are employed by placing the level bar or stock vertically against one face of the element being tested and truing up and then placing the stock on another face which is at a right angle to the tested face.

It will be seen that to get a plumb setting two or more applications of the instrument must be made to different planes of the part tested.

It is, therefore, an object of the present invention to provide a multi-plumb-glass level by which in a single application of the instrument, indications will be given as to verticality in two planes at right angles relatively. The advantage is a material saving of time and effort since the instrument eliminates transferring from one face to another to get the necessary, two true vertical planes.

A further object is to provide a combined level or plumb bar and single universal reading plumb glass.

There are other objects, advantages and features of construction, combination and details of means which will be made manifest in the ensuing specification of the herewith illustrative apparatus; it being understood that modifications, variations and adaptations may be resorted to within the spirit, scope and principle of the invention as it is more directly hereinafter claimed.

Figure 1 is a perspective illustrating how the instrument is used for levelling and for plumb planing.

Figure 2 is a cross-section through the level-bar at the duplex cross or plumb glass.

Figure 3 is a sectional and elevational view of the multiple plane testing glass.

Figure 4 is a partial elevation and vertical section of a fragment of a form showing independent, coordinate cross glasses for vertical plane testing.

The present instrument includes a main stock body of T shape cross-section presenting a wide front bar 2 and a narrower back web 2ª all of the corners being square and all surfaces being true planes.

The level is shown as provided with a suitable horizontal spirit glass or glasses 3 to give reading when either longitudinal side $a$ or $b$ of the level is disposed uppermost, as in Fig. 1.

A particular purpose of this instrument is to enable testing of verticality of a stud, or other part, at one setting of the instrument to indicate position of the part in two planes at right angles to each other, and to test either salient or re-entrant vertical corner angles. To accomplish this duel reading the body 2 is provided with a spirit glass combination designed and arranged to read on two planes at one setting.

In Fig. 2 the body 2 is shown as having a front window 6 which opens through to the back of the body and in this window is mounted a cruciform, spirit glass 7 whose arms meet in the top of the arched glass as seen in Fig. 3.

The glass 7 is set transverse to the length of the level body 2 and when any longitudinal side or edge is placed against a vertical plane the spirit bubble registers with the center index on the glass. To test any two planes meeting in a right angle the level body is placed upright against the part tested as against the corner of a stud S, Fig. 1, and in which position a side of the web 2ª abuts the stud. If the stud is true in both side plane angles then the spirit bulb registers on the index. If both planes are not vertical the bulb will not center until the part is set or built plumb.

The window 6 allows a ready reading of the glass at any vertical setting of the instrument during application of any of its long sides to a plane.

While a cruciform spirit glass 7 is shown in Figs. 1 and 2, a cheaper form of the level is shown in Fig. 4 as having separate, single plane reading glasses 8 and 9. These are set across the body 2 at right angles to each other in coordinate, and relatively close relation so that both may be read substantially at a glance.

What is claimed is:

1. A carpenters' level having a body of T shaped cross-section presenting a web along both sides of which are re-entrant corner angles, said body having a window from front to back of the main or front part, and spirit glasses for multiple, plane indication arranged in the window.

2. A carpenters' level having an elongated body of T-shaped cross-section from end to end and presenting unobstructed, re-entrant angles for application of each side of the medial body flange to corners to be gaged for verticality; the cross-flanges of the body presenting a front face which is apertured through to the backs of the cross-flanges, and level indicating means arranged in the aperture and having limbs in cross-directional relation and transverse to the longitudinal axis of the body.

JOHN SINNER.
OSCAR A. SINNER.